United States Patent
Ihde

(10) Patent No.: US 11,253,942 B2
(45) Date of Patent: Feb. 22, 2022

(54) METHODS AND APPARATUS FOR AUTOMATIC CONTROL OF A WELDING-TYPE POWER SUPPLY

(71) Applicant: Illinois Tool Works Inc., Glenview, IL (US)

(72) Inventor: Jeffery R. Ihde, Greenville, WI (US)

(73) Assignee: Illinois Tool Works Inc., Glenview, IL (US)

( * ) Notice: Subject to any disclaimer, the term of this patent is extended or adjusted under 35 U.S.C. 154(b) by 470 days.

(21) Appl. No.: 16/123,691

(22) Filed: Sep. 6, 2018

(65) Prior Publication Data

US 2019/0076951 A1 Mar. 14, 2019

Related U.S. Application Data

(60) Provisional application No. 62/555,942, filed on Sep. 8, 2017.

(51) Int. Cl.
*B23K 9/10* (2006.01)
*B23K 9/095* (2006.01)
*F02N 11/04* (2006.01)
*F02N 11/08* (2006.01)

(52) U.S. Cl.
CPC .......... *B23K 9/1043* (2013.01); *B23K 9/0953* (2013.01); *B23K 9/0956* (2013.01); *B23K 9/1006* (2013.01); *B23K 9/1012* (2013.01); *B23K 9/1062* (2013.01); *B23K 9/1075* (2013.01); *F02N 11/04* (2013.01); *F02N 11/0818* (2013.01); *F02N 11/0866* (2013.01)

(58) Field of Classification Search
CPC .. B23K 9/1043; B23K 9/0956; B23K 9/1012; B23K 9/1062; F02N 11/04; F02N 11/0866

USPC .......... 219/108, 130.1, 130.21, 133, 137 PS
See application file for complete search history.

(56) References Cited

U.S. PATENT DOCUMENTS

| | | | | |
|---|---|---|---|---|
| 3,569,652 | A | * | 3/1971 | Hauser ..................... H01H 3/30 200/400 |
| 3,596,050 | A | * | 7/1971 | Tikijian ................. B23K 7/102 219/124.03 |
| 4,870,248 | A | * | 9/1989 | Gilliland .............. B23K 9/1068 219/130.4 |
| 4,994,646 | A | * | 2/1991 | Tabata ................... B23K 9/092 219/130.51 |

(Continued)

OTHER PUBLICATIONS

PCT, IPRP dated Mar. 19, 2020, International Application No. PCT/US2018/049901, 7 pages.

*Primary Examiner* — Jimmy Chou
(74) *Attorney, Agent, or Firm* — McAndrews, Held & Malloy, Ltd.

(57) ABSTRACT

A welding-type power system that includes an engine and an electric generator driven by the engine. A power bus configured to connect a power output of the electric generator to one or more of a welding-type output, a power storage device, and a switched mode power supply. A plurality of sensors are configured to monitor a plurality of parameters associated with power demand to and from the power bus and generate a signal indicative of the power demand to and from the power bus based on the monitored plurality of parameters. A controller is configured to receive the signal from the plurality of sensors, the controller to control the engine speed in response to the signal or the power demand.

19 Claims, 3 Drawing Sheets

(56) References Cited

U.S. PATENT DOCUMENTS

| | | | | |
|---|---|---|---|---|
| 5,086,205 A * | 2/1992 | Thommes | B23K 10/00 | 219/121.54 |
| 5,196,668 A * | 3/1993 | Kobayashi | B23K 11/24 | 219/110 |
| 5,319,533 A * | 6/1994 | Reynolds | B23K 9/1006 | 219/137 PS |
| 5,355,075 A * | 10/1994 | Wilson, III | H02J 9/066 | 322/25 |
| 5,408,067 A * | 4/1995 | Crouse | B23K 9/1043 | 219/137 PS |
| 5,444,214 A * | 8/1995 | Crouse | B23K 9/1006 | 219/133 |
| 5,570,254 A * | 10/1996 | Spilger | B23K 11/25 | 219/130.32 |
| 5,601,741 A * | 2/1997 | Thommes | B23H 7/08 | 219/130.21 |
| 5,625,276 A * | 4/1997 | Scott | B23K 9/1062 | 322/24 |
| 5,637,246 A * | 6/1997 | Ikegami | B23K 9/10 | 219/130.33 |
| 5,670,070 A * | 9/1997 | Clark | B23K 9/0953 | 219/130.33 |
| 5,824,990 A * | 10/1998 | Geissler | B23K 9/10 | 219/130.21 |
| 5,886,504 A * | 3/1999 | Scott | B23K 9/1062 | 322/15 |
| 5,900,722 A * | 5/1999 | Scott | B23K 9/1062 | 290/49 |
| 5,968,385 A * | 10/1999 | Beeson | B23K 9/1006 | 219/130.21 |
| 6,018,200 A * | 1/2000 | Anderson | B23K 9/1062 | 290/1 A |
| 6,034,350 A * | 3/2000 | Heraly | B23K 9/1056 | 219/130.31 |
| 6,037,571 A * | 3/2000 | Christopher | A47J 37/0709 | 219/450.1 |
| 6,040,555 A * | 3/2000 | Tiller | B23K 9/1087 | 219/132 |
| 6,054,674 A * | 4/2000 | Moriguchi | B23K 9/1043 | 219/130.21 |
| 6,075,224 A * | 6/2000 | De Coster | B23K 9/0673 | 219/130.4 |
| 6,114,657 A * | 9/2000 | Hayes | B23K 9/124 | 219/132 |
| 6,115,273 A * | 9/2000 | Geissler | B23K 9/1056 | 363/89 |
| 6,121,691 A * | 9/2000 | Renner | B23K 9/1006 | 219/133 |
| 6,127,650 A * | 10/2000 | Naruto | B23K 9/1043 | 219/130.1 |
| 6,310,321 B1 * | 10/2001 | Beeson | B23K 9/0956 | 219/130.21 |
| 6,329,636 B1 * | 12/2001 | Geissler | H02M 1/4208 | 219/130.1 |
| 6,348,671 B1 * | 2/2002 | Fosbinder | B23K 9/1056 | 219/133 |
| 6,504,132 B1 * | 1/2003 | Church | B23K 9/091 | 219/130.1 |
| 6,531,685 B2 * | 3/2003 | Smith | B23K 9/1006 | 219/133 |
| 6,603,097 B2 * | 8/2003 | Leisner | B23K 9/1006 | 219/133 |
| 7,297,899 B2 * | 11/2007 | Fosbinder | B23K 9/0953 | 219/130.21 |
| 7,858,904 B2 * | 12/2010 | Fosbinder | B23K 9/1056 | 219/133 |
| 8,125,094 B2 * | 2/2012 | Radtke | B23K 9/10 | 290/40 B |
| 8,203,069 B2 * | 6/2012 | Gilmore | H01L 31/02021 | 136/244 |
| 8,261,717 B2 * | 9/2012 | Peotter | F02D 41/0205 | 123/350 |
| 8,502,115 B2 * | 8/2013 | DuVal | B23K 9/1006 | 219/133 |
| 8,569,652 B2 | 10/2013 | Albrecht et al. | | |
| 8,627,797 B2 | 1/2014 | Renner | | |
| 8,803,032 B2 | 8/2014 | Matthews et al. | | |
| 8,859,937 B2 * | 10/2014 | DuVal | B23K 9/1068 | 219/133 |
| 9,266,183 B2 | 2/2016 | DuVal | | |
| 9,573,216 B2 | 2/2017 | Enyedy et al. | | |
| 10,864,592 B2 * | 12/2020 | Ulrich | B23K 9/1075 | |
| 2002/0144989 A1 * | 10/2002 | Sammons | B23K 9/1056 | 219/137 PS |
| 2002/0190044 A1 * | 12/2002 | Leisner | B23K 9/1006 | 219/133 |
| 2003/0052108 A1 * | 3/2003 | Rappl | B23K 9/1062 | 219/130.5 |
| 2003/0052109 A1 * | 3/2003 | Hayes | B23K 9/1062 | 219/130.5 |
| 2003/0062351 A1 * | 4/2003 | Davidson | B23K 9/1062 | 219/130.5 |
| 2003/0178398 A1 * | 9/2003 | Nagatoshi | B23K 26/0853 | 219/121.77 |
| 2004/0245232 A1 * | 12/2004 | Ihde | B23K 9/173 | 219/137.71 |
| 2005/0012505 A1 * | 1/2005 | Wilson | G01R 31/3278 | 324/418 |
| 2005/0250375 A1 * | 11/2005 | Allison | H01R 31/06 | 439/502 |
| 2005/0263513 A1 * | 12/2005 | Leisner | B23K 9/1006 | 219/133 |
| 2005/0263514 A1 * | 12/2005 | Albrecht | B23K 9/1006 | 219/133 |
| 2006/0138113 A1 * | 6/2006 | Ott | B23K 9/1087 | 219/132 |
| 2006/0175313 A1 * | 8/2006 | Kooken | B23K 9/09 | 219/130.1 |
| 2006/0213890 A1 * | 9/2006 | Kooken | H02M 1/4225 | 219/130.21 |
| 2007/0051712 A1 * | 3/2007 | Kooken | B23K 9/1043 | 219/130.1 |
| 2007/0181547 A1 * | 8/2007 | Vogel | B23K 9/1081 | 219/130.1 |
| 2008/0006612 A1 * | 1/2008 | Peters | B23K 9/04 | 219/76.14 |
| 2008/0073330 A1 * | 3/2008 | Diedrick | B23K 9/32 | 219/133 |
| 2008/0083705 A1 * | 4/2008 | Peters | B23K 9/091 | 219/61 |
| 2008/0264915 A1 * | 10/2008 | Manthe | B23K 9/0673 | 219/130.31 |
| 2008/0308541 A1 * | 12/2008 | Hiroi | B23K 9/1043 | 219/134 |
| 2009/0008374 A1 * | 1/2009 | Fosbinder | B23K 9/1006 | 219/130.21 |
| 2009/0071949 A1 * | 3/2009 | Harris | B23K 9/1062 | 219/130.1 |
| 2010/0193489 A1 * | 8/2010 | Beeson | B23K 9/1056 | 219/133 |
| 2010/0314181 A1 * | 12/2010 | Beeson | B60K 25/02 | 180/53.5 |
| 2010/0314372 A1 * | 12/2010 | DuVal | B23K 9/1068 | 219/133 |
| 2010/0320183 A1 * | 12/2010 | Borchert | B23K 9/1043 | 219/130.1 |
| 2011/0000900 A1 * | 1/2011 | Luo | H02M 3/337 | 219/130.1 |
| 2011/0006046 A1 * | 1/2011 | Albrecht | B23K 9/1006 | 219/133 |
| 2011/0073569 A1 * | 3/2011 | Rappl | B23K 9/1006 | 219/73.2 |
| 2011/0114607 A1 * | 5/2011 | Albrecht | B23K 9/1006 | 219/108 |
| 2011/0284527 A1 * | 11/2011 | Holverson | B23K 9/235 | 219/660 |
| 2011/0309054 A1 * | 12/2011 | Salsich | B23K 9/133 | 219/108 |

(56) References Cited

U.S. PATENT DOCUMENTS

| | | | | |
|---|---|---|---|---|
| 2011/0309055 A1* | 12/2011 | Rozmarynowski | H02K 7/003 | 219/108 |
| 2012/0097644 A1* | 4/2012 | Ott | B23K 9/124 | 219/108 |
| 2012/0097655 A1* | 4/2012 | Daniel | B23K 9/091 | 219/130.21 |
| 2012/0097656 A1* | 4/2012 | Peters | B23K 9/1043 | 219/130.51 |
| 2012/0111842 A1* | 5/2012 | Fujiwara | B23K 9/09 | 219/130.33 |
| 2012/0118865 A1* | 5/2012 | Stava | B23K 37/006 | 219/130.31 |
| 2012/0138582 A1* | 6/2012 | Radtke | B23K 9/10 | 219/121.27 |
| 2012/0138587 A1* | 6/2012 | Fosbinder | B23K 9/1006 | 219/133 |
| 2013/0068744 A1* | 3/2013 | Matsui | B23K 9/173 | 219/137 R |
| 2013/0327753 A1* | 12/2013 | Roth | B23K 9/09 | 219/137.71 |
| 2013/0327754 A1* | 12/2013 | Salsich | B23K 9/1043 | 219/137.71 |
| 2014/0131320 A1* | 5/2014 | Hearn | B23K 9/092 | 219/74 |
| 2014/0131329 A1* | 5/2014 | Meckler | B23K 9/32 | 219/130.1 |
| 2014/0263245 A1* | 9/2014 | Ulrich | B23K 9/1081 | 219/133 |
| 2014/0374398 A1* | 12/2014 | Manthe | B23K 9/1043 | 219/130.21 |
| 2015/0114941 A1* | 4/2015 | Denis | B23K 9/095 | 219/132 |
| 2015/0273607 A1* | 10/2015 | Denis | B23K 9/1087 | 219/133 |
| 2015/0273609 A1* | 10/2015 | Denis | B23K 9/1087 | 219/132 |
| 2016/0067809 A1* | 3/2016 | Enyedy | B23K 9/32 | 219/133 |
| 2016/0183330 A1* | 6/2016 | Sigi | H05B 6/36 | 219/672 |
| 2016/0184917 A1* | 6/2016 | Albrecht | B23K 9/1062 | 219/133 |
| 2016/0256950 A1* | 9/2016 | Madsen | B23K 9/32 | |
| 2016/0303677 A1* | 10/2016 | Furman | B23K 9/1081 | |
| 2016/0325373 A1* | 11/2016 | Ulrich | B23K 9/095 | |
| 2017/0036290 A1* | 2/2017 | Enyedy | B23K 9/1043 | |
| 2017/0036291 A1* | 2/2017 | Enyedy | B23K 9/1043 | |
| 2017/0259368 A1* | 9/2017 | Enyedy | B23K 9/32 | |
| 2017/0326670 A1* | 11/2017 | Enyedy | F02N 11/0862 | |
| 2018/0043454 A1* | 2/2018 | Smith | B23K 9/1006 | |
| 2018/0161910 A1* | 6/2018 | Enyedy | B23K 9/0953 | |
| 2019/0160580 A1* | 5/2019 | Hruska | B23K 9/1006 | |
| 2019/0232413 A1* | 8/2019 | Ulrich | B23K 9/1043 | |
| 2020/0189020 A1* | 6/2020 | Zwayer | B23K 9/1006 | |

* cited by examiner

METHODS AND APPARATUS FOR AUTOMATIC CONTROL OF A WELDING-TYPE POWER SUPPLY

CROSS-REFERENCE TO RELATED APPLICATIONS

This patent application claims priority to and the benefit of U.S. Provisional Patent Application Ser. No. 62/555,942, filed on Sep. 8, 2017, which is incorporated herein by reference in its entirety.

BACKGROUND

Conventional welding-type power supplies provide power for welding-type tools. Some such power supplies are coupled to a gas powered engine which drives an electric generator. In some cases, the electric generator can generate both welding-type power to provide power to a variety of tools, such as welding-type torches, plasma cutters, etc., as well as related components, such as a battery charger. Often, once an engine is turned on it remains on and running even when no power is needed, which can waste fuel and cause unnecessary wear on the gas powered engine. A system that regulates operation of the engine to limit the amount of idle time is therefore desirable.

SUMMARY

Apparatus and methods are disclosed of a welding-type power system configured to automatically start and/or stop in response to a demand for power from the system, substantially as illustrated by and described in connection with at least one of the figures, as set forth more completely in the claims.

In disclosed examples, a welding-type power system includes an engine, an electric generator driven by the engine, a power bus configured to connect a power output of the electric generator to one or more of a welding-type output, a power storage device, and a switched mode power supply. A plurality of sensors are configured to monitor a plurality of parameters associated with power demand to and from the power bus, and generate a signal indicative of the power demand to and from the power bus based on the monitored plurality of parameters. A controller is configured to receive the signal from the plurality of sensors, the controller to control the engine speed in response to the signal or the power demand.

The controller is configured to determine a power demand level at the power bus based on the signal, and compare the determined power demand level to a plurality of threshold power demand levels. The controller is further configured to increase the speed of the engine in response to the power demand level being above a first threshold power demand level. The controller activates the switched mode power supply in response to the power demand level being below a first threshold power demand level. The controller transfers power from the power storage device to provide power to the switched mode power supply.

The controller further controls both the power storage device and the engine to provide power to the power bus in response to the power demand level being above a second threshold power demand level. In examples, the plurality of parameters includes one or more of temperature, resistance, current or voltage. The electric generator can also be configured to provide power to the power output and to the power storage device simultaneously.

In an example, an output switched mode power supply configured to condition output power from the power bus at a power level different from a welding-type power output. In some examples, the controller determines the power demand corresponding to a tool at the power bus based on the signal; and controls the engine to increase in speed to turn the electric generator to provide power to the power output. The controller can determine the power demand corresponding to the power storage device at the power bus based on the signal and condition the power output to provide power to recharge the power storage device.

Some example systems employ a user interface providing a list of options for operation of the system, the list including a level of power output of the welding-type power system.

The controller is configured to monitor a power level of the power storage device during operation of the electric generator, and to disconnect the power storage device from the power bus during operation of the electric generator in response to a signal indicating the power storage device is charged to capacity. The controller is configured to connect the power storage device to the power bus during operation of the electric generator in response to a signal indicating the power storage device is charged below capacity.

In some examples, a method of operating a welding-type power system includes monitoring, by a plurality of sensors, a plurality of parameters associated with a power demand to and from a power bus connected to an electric generator and an output, generating, at the plurality of sensors, a signal indicating a demand for power across the power bus, receiving, at a controller, the signal from the plurality of sensors. In response, the controller controls a speed of an engine configured to drive the electric generator in response to the signal or the demand for power.

In some examples, a level of power demand based on the signal is identified. It is also determined whether the level of power demand exceeds a threshold level. The engine speed in response to the determined level of power demand exceeding the threshold level is controlled accordingly.

A level of power demand based on the signal is identified, and it is determined whether the level of power demand is below a threshold level. A power storage device to provide power to the power bus in response to the determined level of power demand being below the threshold level is controlled accordingly.

In some examples, one or more parameters of the monitored plurality of parameters corresponding to activation of one of the engine and a power storage device are measured. The one or more parameters are stored in a memory storage device. The stored one or more parameters are updating based on usage trends of the system. A first trigger when a rate and a value of the monitored plurality of parameters corresponds to activation of the engine based on the stored one or more parameters, and a second trigger is generated when the rate and the value of the monitored plurality of parameters corresponds to a power level corresponding to the power storage device based on the stored one or more parameters.

The controller controls the engine speed in response to the rate and the value of the monitored plurality of parameters corresponding to the first trigger, and controls the power storage device to provide power to the power bus in response to the rate and the value of the monitored plurality of parameters corresponding to the second trigger. Controlling the engine can include one of increasing the speed, decreasing the speed to zero, or operating at an idle speed.

The controller can also transmit a test signal to the output to determine the power demand level, monitor a feedback signal in response to the test signal, and determine a power output level based on the feedback signal.

In some examples, a welding-type power system includes an engine configured to operate at variable speeds. An electric generator driven by the engine to generate power proportional to an operating speed of the engine. A power bus is configured to connect a power output of the electric generator to one or more of a welding-type output, a power storage device, and a switched mode power supply. A plurality of sensors configured to monitor a plurality of parameters associated with power demand to and from the power bus. And a controller is configured to control the engine speed and the power storage device to provide power to the power bus in response to the power demand.

In examples, the controller controls the power storage device to provide power to the power bus and controls the engine to operate at an idle speed in response to the power demand below a first threshold level. The engine can be controlled to increase in speed to a first level in response to the power demand exceeding a first threshold level. Additionally or alternatively, the engine can be controlled to increase in speed to a second level in response to the power demand exceeding a second threshold level.

A power demand level can be determined based on the plurality of parameters, and the engine can be controlled to increase in speed above an idle speed and below a maximum operating speed to provide a first portion of the power demand level, and the power storage device can be controlled to provide power to the power bus to provide a second portion of the power demand level.

In some examples, a welding-type power system includes an engine configured to operate at variable speeds. An electric generator is driven by the engine to generate power proportional to an operating speed of the engine. A power bus is configured to connect a power output of the electric generator to one or more of a welding-type output, a power storage device, and a switched mode power supply. A plurality of sensors are configured to monitor a plurality of parameters associated with power demand to and from the power bus. In addition, a controller is configured to control the engine speed and the power storage device to provide power to the power bus in response to the power demand.

BRIEF DESCRIPTION OF THE DRAWINGS

The figures are not necessarily to scale. Where appropriate, similar or identical reference numbers are used to refer to similar or identical components.

DETAILED DESCRIPTION

Figure 1:
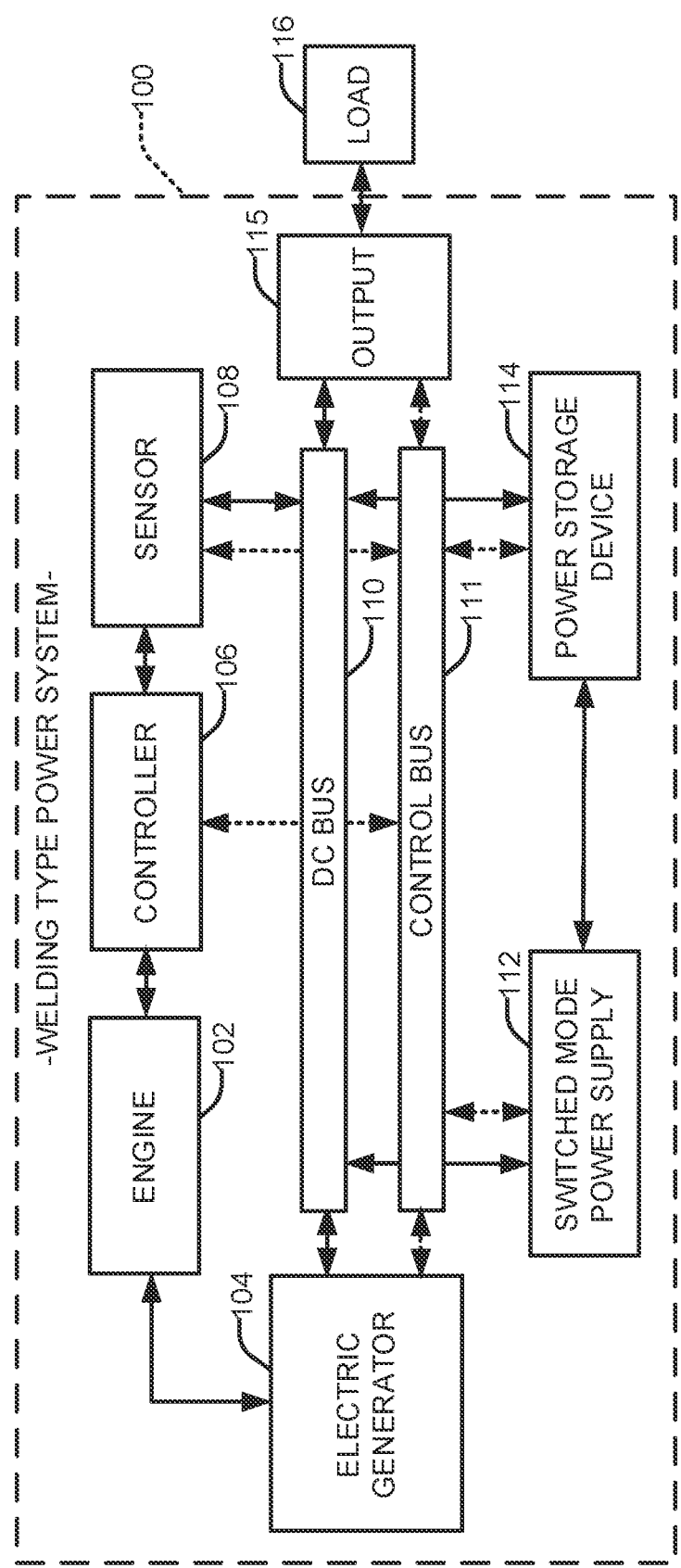
FIG. 1 is a block diagram of an example welding-type power system in accordance with aspects of this disclosure.

Disclosed are examples of an engine driven welding-type power system configured to automatically, start, stop and/or adjust the speed of the engine based on the system's monitored power demand level. Additionally or alternatively, the determination to start and/or stop can be based on a charge and/or discharge status of a power storage device associated with the system.

Engine driven welding systems can be employed to turn an electric generator used to power multiple welding-type tools (e.g., a welding-type torch, a wire feeder, a plasma torch, etc.), and can be in use for extended periods of time. When the system is not actively providing power to a tool, etc., there are limited or no power demands. In other words, the engine can be operating, consuming fuel, generating emissions, wearing down internal components, etc., although no power is being drawn from the generator. Such an idle period can be expensive and potentially hazardous.

It would be advantageous to monitor the system power usage, as well as maintain the maximum storage capacity of a power storage device of the system. When little or no power is being drawn from the system, such that no welding-type tool is in use and/or the power storage device is fully charged, the engine would automatically turn off. In this instance, system standby power would be provided from stored energy.

In examples, a power storage device can provide power in some circumstances, such as a low power demand at the output (e.g., lighting, small power tools, etc.), or a short period of higher power demand (e.g., a brief weld or cut, employing power storage and a switched mode power supply). When energy usage demand exceeds the energy capacity of the power storage device, the engine would automatically increase in speed or turn on. In some examples, both the power storage device and the engine can operate simultaneously. For instance, the level of power drawn from each can be selected based on one or more factors (e.g., desired output, desired engine operating speed, fuel level, power storage reserves, number and type of tools/accessories drawing power, etc.). A controller can monitor the factors and other inputs to determine the power to be drawn from each source.

In some circumstances, the engine may be running at a lower speed to reduce fuel consumption and environmental noise, yet a power demand exists at the output that exceeds the power output at the selected engine speed. In this scenario, the power supply can be connected to the power bus to provide additional power without increasing the running speed of the engine. This on-demand increase of power from the power supply may also be useful in maintaining a lower, consistent engine speed, where a short sudden increase in demand is satisfied by drawing power from the power storage device.

Advantageously, the system operating characteristics would not change with the change in speed of the engine. The system operating characteristics would also not change with the system running from stored energy. In particular, weld starts and stops, welding power and auxiliary power would be maintained and delivered at the same levels regardless of whether the engine is activated, deactivated and/or running at various speeds.

Engine driven welding-type systems in the past required operators to tap electrodes on work pieces to restart systems, or use an external device (e.g., a remote control) to start and stop an engine driven system. Typically, the result was a degraded arc start and/or an operator would be required to take further action to start, restart or stop the system. The result was that operators would miss one or more required steps to start or stop the engine; remotes would get lost and/or left in inconvenient places (and therefore go unused); and weld starts were degraded; and other power needs, such as systems requiring auxiliary power, could not be accommodated by such a system.

Employing a welding-type power system with a variable speed engine configured to automatically start and stop, as described herein, overcomes the challenges faced in conventional systems. Among the many advantages include a reduction in fuel consumption, noise and emissions, increased engine life with the reduction in engine run time, which will improve engine performance and increase the life expectancy by reducing low load idle time.

As used herein, the term "welding-type power" refers to power suitable for welding, plasma cutting, induction heating, CAC-A and/or hot wire welding/preheating (including laser welding and laser cladding). As used herein, the term "welding-type power supply" refers to any device capable of, when power is applied thereto, supplying welding, plasma cutting, induction heating, CAC-A and/or hot wire welding/preheating (including laser welding and laser cladding) power, including but not limited to inverters, converters, resonant power supplies, quasi-resonant power supplies, and the like, as well as control circuitry and other ancillary circuitry associated therewith.

As used herein, a "circuit" includes any analog and/or digital components, power and/or control elements, such as a microprocessor, digital signal processor (DSP), software, and the like, discrete and/or integrated components, or portions and/or combinations thereof.

FIG. 1 is a block diagram of a welding-type power system 100. The example power system 100 includes a variable speed engine 102 connected to an electric generator 104 to feed a common electric power bus 110. A controller 106 is connected to the engine 102, a sensor 108, and a control bus 111. The sensor 108 is connected to the power bus 110 to monitor changes in voltage, current, resistance, etc., associated with the power bus 110. Such changes can indicate power consumption and/or input from a switched mode power supply 112, and/or a power storage device 114, each of which is connected to the power bus 110. In examples, the power storage device 114 can connect to the power bus 110 via a bi-directional converter, such that the power storage device 114 can provide power to and/or draw power from the power bus 110. A load 116 can connect to the system 100 via an output 115. The welding-type power system 100 can provide welding-type power to a welding-type torch (e.g., MIG, TIG, GMAW, FCAW, plasma cutter, etc.), a preheating device, a wire feeder, etc., as well as provide battery level power to charge a battery.

Each component of system 100 connects to control bus 111 to convey information and/or commands, represented by dashed lines in FIG. 1. In this manner, information and control signals can be transmitted via a common bus, such that individual components do not require additional wiring or dedicated communication lines to communicate with each component. Additionally or alternatively, one or more component may be in direct communication with another component, for example, the controller 106 can be directly linked to the engine 102 and/or the sensor 108. The system sensor 108 could be one or more sensors configured to monitor signals corresponding to, among other things, bus voltage, bus current, and charge/discharge parameters. The information provided by the signal to the controller 106 is used to determine when the engine 102 is to be turned on and/or off.

In an example, the system 100 would employ the power bus 110 (e.g., a common direct current (DC) bus) with a voltage sufficient to power a welding-type tool. In some examples, the power bus 110 can be converted to make 115 or 220 volts alternating current (VAC) to power auxiliary power components (e.g., a wire feeder), plasma cutters, a battery charger, and a compressed air system, as well as other systems. The common power bus 110 could connect to the switched mode power supply 112 (e.g., a power inverter) to condition the bus voltage. Thus, in some examples, systems such as plasma cutters use integrated inverters to run directly off of the power bus 110. Additionally or alternatively, the bus power can be augmented by the power storage device 114, such as a battery, supercapacitor, or any other suitable storage device. In an example, the controller 106 of FIG. 1 can be configured as a processor or microcontroller, such as a programmable logic circuit, a system-on-chip, a programmable logic device, and/or any other type of logic circuit. The power output 115 may be implemented as a circuit using power semiconductors, electromechanical devices, and/or any other type(s) and/or combinations of switching device. For instance, the power output 115 can transfer power via power bus 110 and information between the load 116 and the power system 100 via the control bus 111.

In the example of FIG. 1, the power output 115 provides a port or terminal for the power supply 100 to provide power to the load 116. In an example, the power output 115 is configured for a particular type of connection (e.g., a welding-type torch cable), while in other examples the power output 115 can be modified to accept multiple types of connectors. In this example, the multi-mode power output 106 may be configured with multiple connection outputs, and/or one or more adapters to accommodate various loads 116 (e.g., a welding-type torch, a rechargeable battery, 120 volt power cord, etc.).

Additional and/or alternative parameters measured by the sensor 108 may provide information of the power storage device 114. Identified parameters of a particular battery may include a charge state of the power storage device 114, a nominal voltage of the power storage device 114 (e.g., an output voltage when the energy storage device is charged to capacity), and/or any other parameter that can be recognized in the signal, resistance, current, temperature, for example. The controller 106 controls the power system 100 output/source based on the identified parameter(s).

In examples, information regarding system usage trends can be monitored and stored. These stored trends can be used to predict when the controller 106 should control the speed of the engine 102 to start, stop or idle. Further, if demand at the load 116 is higher than peak demand of the engine 102, the controller 106 can automatically activate both the power storage device 114 and the engine 102 to generate additional power during high demand operations. Thus, both the engine 102 and the power storage device 114 can be activated at the same time for load conditions that would normally exceed the power delivery capabilities of the engine 102 alone.

In an example, the controller 106 communicates with the power output 115 to, for example, transmit a test signal to the load 116 and receive a feedback signal that indicates one or more parameters associated with the load 116, for example, a type and/or power requirements of the load 116. The controller 106 communicates with the welding-type power system 100 to control the type and amount of power provided to the power output 115, and/or receive data from the welding-type power system 100. Once the controller 106 processes the information from the sensor 108, the controller 106 will activate an appropriate power source for the measured power draw (e.g., the electric generator 104, the switched mode power supply 112, and/or the power storage device 114).

Activating the engine 102 to generate power according to the determined power draw may be driven automatically by the controller 106. In an example, the presence or absence of a power draw, such as a load 116, and/or a change in the load 116 at the output 115, generates an automatic response by the controller 106 to activate a power source of the welding-type power system 100 for a specific power demand. Additionally or alternatively, the controller can periodically transmit a test signal to continually monitor the load 116 at the output 115 (e.g., to determine when a welding-type torch is present, or a rechargeable battery is fully charged).

By communicating with the sensor 108, the controller 106 controls the welding-type power system 100 based on one or more current-voltage curves in accordance with power across the bus 110. In examples, the controller 106 responds to signals from the sensor 108 which represent a presence and a type of power draw. In response, the controller 106 can activate the engine 102 to drive the electric generator 104. Alternatively, the controller 106 can activate the switched mode power supply 112 and/or the power storage device 114. For instance, when the load 116 is a welding-type torch, the sensor 108 will measure a power draw associated with welding-type power. When the measured power draw indicates a different type of load (e.g., a rechargeable battery) the sensor 108 transmits a corresponding signal to the controller 106.

In some examples, the power storage device 114 is a rechargeable battery pack (e.g., a lithium-ion battery, a nickel-metal hydride battery, etc.). In other examples, the power storage device 114 is a hybrid battery module, a capacitor, a supercapacitor, or any other type of suitable storage device.

In some examples, the sensor 108 periodically and/or continually monitors for one or more conditions (e.g., an externally sourced voltage present at the load 116) to determine a change in the power demand at the load 116. If a change in power demand is detected by the controller 106, the controller 106 can control the speed of the engine 102. In low load situations, the engine 102 may be turned off.

In a battery recharging operation, by monitoring the signal, the controller 104 can detect an end of a charging operation. In response to detecting the end of the charging operation (i.e., the feedback signal indicates the battery is fully charged), the controller 104 can command the welding power source 104 to end provision of power to the output 106 and/or modify a sub-mode (e.g., change from a normal battery charging sub-mode to a trickle charging sub-mode). In this manner, the power supply 100 can automatically adjust to a change in the power needs of the load 108 (e.g., as the battery becomes fully charged).

Although shown with a single output 115, additionally and/or alternatively, the system 100 can employ multiple outputs. In some examples, each output can connect to the power bus 110 and the control bus 111. In other examples, one or more outputs can connect directly to one or more of the power sources. In each event, the controller 106 can selectively control the power provided to each output, such as in response to a measured parameter.

In some examples, the controller 106 can control the power supply 100 to provide power to the load 116 via the bus 110, while the power storage device 114 provides power directly to another load. Consistent with the disclosed examples, each of the loads can provide the same level of power (e.g., each operating in a welding mode or a battery recharging mode), or different levels of power. In this example, the load 116 can be operating in a welding mode, and another load can be powering a rechargeable battery. In yet another example, the output 115 provides auxiliary 115 or 220 VAC power during a welding operation to power, e.g., lights, a grinder, a battery charger, etc.

In some examples, the system 100 can include an interface (e.g., a switch, a computer input device, etc.) to provide option for an operator to control a function of the power sources and/or outputs at the system 100. Additionally or alternatively, the user interface can include a list of operations with either a set of known parameters, or a list of operations that correspond to a learned operation. Thus, the known or historical actions and conditions during a particular operation will aid in the determination of when to start, stop or change speed of the engine 102.

In some examples, the engine is a variable speed engine. Thus, the engine can be controlled to operate over a range of speeds (e.g., rotate at variable revolutions per minute), with the engine speed directly relating to the output to turn the electric generator.

During operation of the system, the controller is configured to receive measurements of one or more parameters associated with a power demand to or from the power bus, such as voltage, current, time, temperature, to name just a few. Based on one or more of the measurements, including changes to one or more parameters with respect to time, the controller can calculate a power demand at the power bus.

The controller can measure the speed by which the engine is currently rotating, and the power level of the power storage device. Based on one or a combination of measurements, the controller can apply an algorithm or other process to determine the power delivery capacity of each of the engine and the power storage device. Based on the calculated power demand and the respective power delivery capacities, the controller can employ one or both of the engine and the power storage device to provide power to the power bus.

In an example, the calculated power demand corresponds to a relatively small output (e.g., for a hand tool, or a quick welding type operation), such that the power storage device can provide sufficient power via a switch mode power supply, a converter, etc. Additionally or alternatively, the engine can be controller to rotate at a speed that corresponds to the small output demand.

If a greater power demand is calculated, such as an extended welding type operation or multiple devices are drawing power form the system, the controller may control the engine to rotate at a higher speed to generate a greater power output.

In some examples, the power storage device and the engine can be operated simultaneously to supply the calculated power output. For instance, operating the engine at a speed below the maximum operating speed will consume less fuel, generate fewer emissions and lower noise levels, and cause less wear on internal components, extending the life of the engine. Thus, the controller may determine that, although the calculated power demand is below a maximum operating output of the engine, combining the engine output and the power storage device output is desirable.

The controller can include a matrix or other list of values that associates power demand levels and power output capacities of the engine and the power storage device to calculate one or more operating combinations to provide the calculated power demand. For example, the engine can provide variable power outputs based on a rotation speed of the engine. Further, the power storage output can vary as needed.

Advantageously, the system can generate a power output that exceeds the rated output of the engine. For instance, a power output from the engine at full operating speed can be supplemented by the power storage device. Thus, a system the employs a relatively small engine can power equipment and operations that would require a larger engine with a greater capacity. The system described herein can therefore have a smaller size, consume less fuel, generate less noise, and yet still provide a power output rated for a larger, conventional system.

The power storage device can be rechargeable. Thus, even at low speeds (e.g. at idle) the engine can provide power sufficient to recharge the power storage device.

Figure 2:
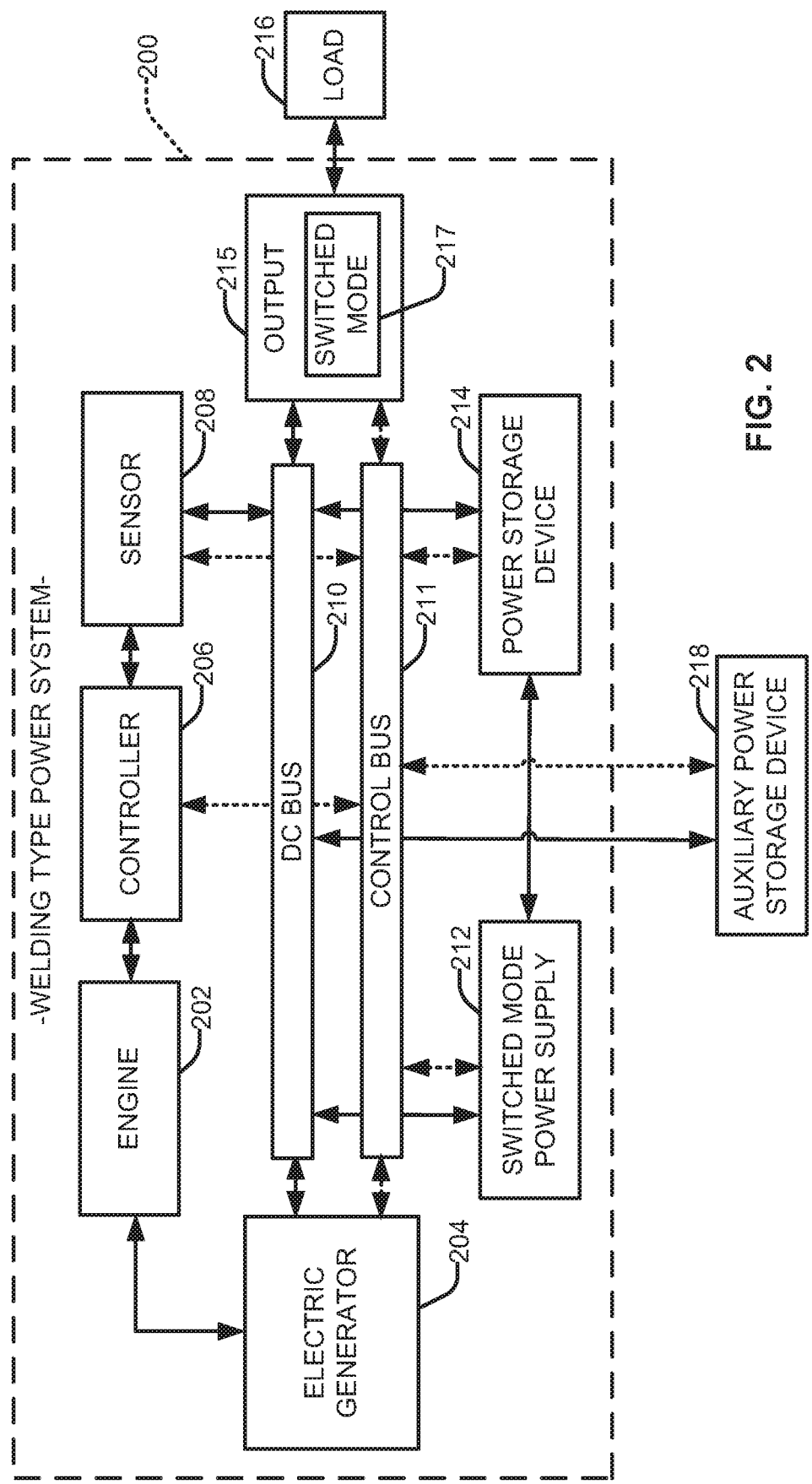
FIG. 2 is a block diagram of another example welding-type power system in accordance with aspects of this disclosure.

FIG. 2 is another block diagram of an example welding-type power system 200. The example power system 200 of FIG. 2 is similar to the power system 200 of FIG. 1, with the exception that an auxiliary storage device 218 is connected to the welding-type system 200, and an additional switched mode power supply 217 is available to the system 200. In this example, the controller 206 can operate and communicate generally in a manner consistent with the welding-type power supply 100 of FIG. 1 via power bus 210 and control bus 211, as described herein. Additionally and/or alternatively, the controller 106 can operate such that welding-type power is sourced from the storage device 214, and/or selectively draw power from the auxiliary power storage device 218. In some examples, the system 200 can provide a power output to the auxiliary power storage device 218, when the auxiliary power storage device 218 is a rechargeable battery, for instance.

The auxiliary power storage device 218 can be remotely located and connected by a power cable or other means, and/or can be removable from the power system 200.

The auxiliary power storage device 218 can be used to provide an alternate source of power, for instance, when the power system 200 is not connected to or being supplied with mains power, engine generated power, etc. The auxiliary power storage device 218 can also be used to supplement power provided by the power system 200.

Recharging can occur automatically, based on a signal (e.g., from one or more sensors) indicating the auxiliary storage device 218 is in need of a charge. Further, the controller 206 may command the welding power system 200 to charge energy storage device 218, even when welding is not occurring. Additionally and/or alternatively, a switch can be provided for a user to initiate recharging of the auxiliary storage device 218.

In some examples, the switched mode power supply 217 is integrated with the output 215 to condition output power in accordance with a measured parameter at load 216. In this manner, the system 200 can provide a first power output in accordance with a power level on the power bus 210, and condition power for a second power output. Such a situation could arise when multiple loads of differing power ratings are drawing power from the system 200 at once. Although illustrated as integrated with the output 215, the switched mode power supply 217 can be located at any location within the system 200, including along the power bus 210.

Figure 3:
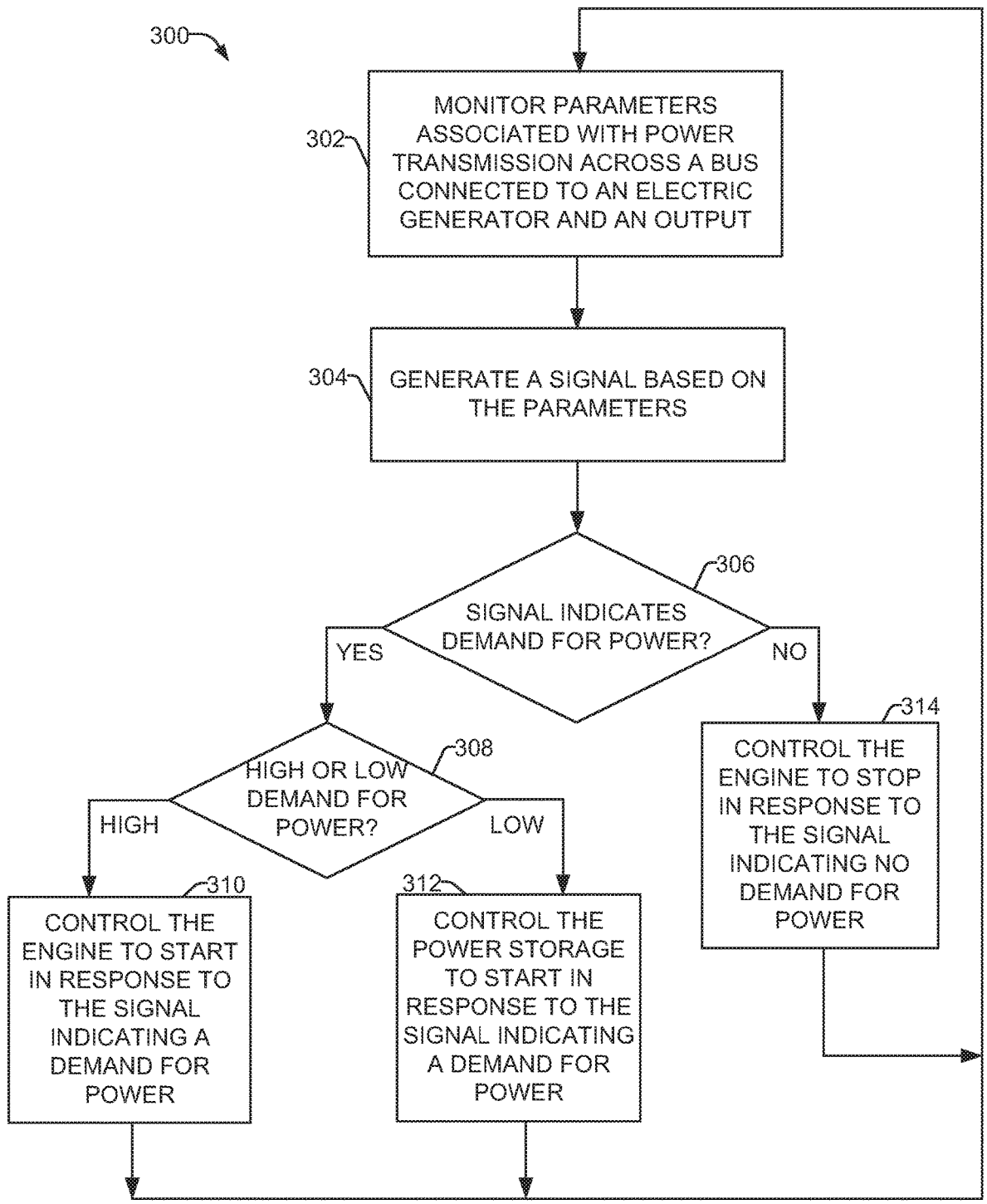
FIG. 3 illustrates an example method of operating a welding-type power system in accordance with aspects of this disclosure.

FIG. 3 is a flowchart illustrating example method 300 of operating a welding-type power system, for example, the welding-type power systems 100 and 200 of FIGS. 1-2. The method 300 of FIG. 3 may be implemented by the controllers 106 and 206 of FIGS. 1-2 by executing machine readable instructions, such as stored on a non-transitory machine readable storage device. At block 302, a sensor (e.g., the sensor 108) monitors a plurality of parameters associated with power transmission across a bus (e.g., the power buses 110, 210). At block 304, the sensor generates a signal based on the parameters. At block 306, a controller (e.g., the controllers 106, 206) determines whether the signal indicates a demand for power, such as at an output (e.g., the outputs 115, 215) connected to the bus based on the signal.

If the signal indicates a demand for power, at block 308 the controller determines if the demand is for high or low power. If the demand is for high power, at block 310 the controller controls the engine to increase speed. If the demand for power is low, at block 312, the controller controls the power storage device to activate and provide power for the load.

If the controller determines there is no demand for power, at block 314 the controller controls the engine to increase speed in response to the signal. Each of blocks 310, 312 and 314 will return to block 302 in a loop to continuously monitor the system parameters during operation of the system. Thus, if a signal changes from a low demand to a high demand, or if the power storage device reaches a low capacity level, the monitored parameters will signal to the controller to activate a different or additional power source.

The present methods and systems may be realized in hardware, software, and/or a combination of hardware and software. Example implementations include an application specific integrated circuit and/or a programmable control circuit.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

While the present method and/or system has been described with reference to certain implementations, it will be understood by those skilled in the art that various changes may be made and equivalents may be substituted without departing from the scope of the present method and/or system. For example, block and/or components of disclosed examples may be combined, divided, re-arranged, and/or otherwise modified. In addition, many modifications may be made to adapt a particular situation or material to the teachings of the present disclosure without departing from its scope. Therefore, the present method and/or system are not limited to the particular implementations disclosed. Instead, the present method and/or system will include all implementations falling within the scope of the appended claims, both literally and under the doctrine of equivalents.

What is claimed is:

1. A welding-type power system, comprising:
an engine;
an electric generator driven by the engine;

a power bus configured to connect a power output of the electric generator to one or more of a welding-type output, a power storage device, and a switched mode power supply;

a plurality of sensors configured to:
monitor a plurality of parameters associated with power demand to and from the power bus; and
generate a signal indicative of the power demand to and from the power bus based on the monitored plurality of parameters; and a controller configured to:
receive the signal from the plurality of sensors;
determine a power demand level at the power bus based on the signal;
compare the determined power demand level to a plurality of threshold power demand levels; and
control the engine speed in response to the signal or the determined power demand level.

2. The welding-type power supply as defined in claim 1, the controller further configured to increase the speed of the engine in response to the power demand level being above a first threshold power demand level.

3. The welding-type power supply as defined in claim 1, the controller further configured to activate the switched mode power supply in response to the power demand level being below a first threshold power demand level.

4. The welding-type power supply as defined in claim 3, the controller further configured to transfer power from the power storage device to provide power to the switched mode power supply.

5. The welding-type power supply as defined in claim 1, the controller further configured to control both the power storage device and the engine to provide power to the power bus in response to the power demand level being above a second threshold power demand level.

6. The welding-type power supply of claim 1, wherein the plurality of parameters includes one or more of temperature, resistance, current or voltage.

7. The welding-type power supply of claim 1, wherein the electric generator is configured to provide power to the power output of the electric generator and to the power storage device simultaneously.

8. The welding-type power supply of claim 1, further comprising an output switched mode power supply configured to condition output power from the power bus at a power level different from a welding-type power output.

9. The welding-type power supply of claim 1, wherein the controller is further configured to:
determine the power demand corresponding to a load at the power bus based on the signal; and
control the engine to increase in speed to turn the electric generator to provide power to the power output.

10. The welding-type power supply of claim 1, wherein the controller is further configured to:
determine the power demand corresponding to the power storage device at the power bus based on the signal; and
condition the power output from the power bus via an output switched mode power supply to provide power to recharge the power storage device.

11. The welding-type power supply of claim 1, further comprising a user interface providing a list of options for operation of the system, the list including a level of power output of the welding-type power system.

12. The welding-type power supply of claim 1, wherein the controller is configured to monitor a power level of the power storage device during operation of the electric generator.

13. The welding-type power supply of claim 12, wherein the controller is configured to disconnect the power storage device from the power bus during operation of the electric generator in response to a signal indicating the power storage device is charged to capacity.

14. The welding-type power supply of claim 12, wherein the controller is configured to connect the power storage device to the power bus during operation of the electric generator in response to a signal indicating the power storage device is charged below capacity.

15. A welding-type power system, comprising:
an engine configured to operate at variable speeds;
an electric generator driven by the engine to generate power proportional to an operating speed of the engine;
a power bus configured to connect a power output of the electric generator to one or more of a welding-type output, a power storage device, and a switched mode power supply;
a plurality of sensors configured to monitor a plurality of parameters associated with power demand to and from the power bus; and
a controller configured to:
determine a power demand level based on the plurality of parameters;
control the engine speed to provide a first portion of the power demand level; and
control the power storage device to provide a second portion of the power demand level to the power bus in response to the power demand level.

16. The system of claim 15, wherein the controller is configured to:
control the power storage device to provide power to the power bus; and
control the engine to operate at an idle speed in response to the power demand below a first threshold level.

17. The system of claim 15, wherein the controller is configured to control the engine to increase in speed to a first level in response to the power demand exceeding a first threshold level.

18. The system of claim 15, wherein the controller is configured to control the engine to increase in speed to a second level in response to the power demand exceeding a second threshold level.

19. The system of claim 15, wherein the controller is configured to
control the engine to increase in speed above an idle speed and below a maximum operating speed to provide the first portion of the power demand level.

* * * * *